United States Patent [19]
Siddall et al.

[11] 3,711,548

[45] Jan. 16, 1973

[54] CYCLOPROPYL SUBSTITUTED ALIPHATIC AMINES

[76] Inventors: John B. Siddall, 975 California Avenue, Palo Alto, Calif.; Jean Pierre Calame, Villa LaPerla, 6605 Locarno, Switzerland

[22] Filed: July 20, 1970

[21] Appl. No.: 63,963

Related U.S. Application Data

[60] Division of Ser. No. 841,559, July 14, 1969, abandoned, which is a continuation-in-part of Ser. No. 800,267, Feb. 18, 1969, abandoned, which is a continuation-in-part of Ser. No. 618,321, Feb. 24, 1967, abandoned.

[52] U.S. Cl..........260/563 R, 260/247, 260/247.7 G, 260/268 R, 260/293.51, 260/293.67, 260/326.8, 260/340.9, 260/348 R, 260/488 H, 260/501.1, 260/561 D, 260/561 N, 260/573, 260/574, 260/576, 260/577, 260/593 N, 260/594, 260/614 R, 260/632 R, 260/638 R, 260/653.3, 424/248, 424/250, 424/267, 424/325

[51] Int. Cl............................................C07c 87/24
[58] Field of Search.................................260/563 R

[56] References Cited

UNITED STATES PATENTS

| 3,541,154 | 11/1970 | Schmialek et al. | 260/583 |
| 3,669,997 | 6/1972 | Calame et al. | 260/405 |

*Primary Examiner*—Lewis Gotts
*Assistant Examiner*—D. R. Phillips
*Attorney*—Donald W. Erickson

[57] ABSTRACT

3,7,11-Trialkyl aliphatic amines having a chain length of 12 to 17 carbons substituted at positions C-2,3, C-6,7 and/or C-10,11 with cyclopropyl group which are useful for the control of insects.

8 Claims, No Drawings

CYCLOPROPYL SUBSTITUTED ALIPHATIC AMINES

This is a division of application Ser. No. 841,559 filed July 14, 1969 which in turn is a continuation-in-part of application Ser. No. 800,267 filed Feb. 18, 1969, which is a continuation-in-part of application Ser. No. 618,321 filed Feb. 24, 1967, each now abandoned.

The present invention relates to novel organic compounds and to processes for their preparation.

More specifically, the present invention pertains to certain compounds that inhibit maturation of arthropods and to processes for the preparation of such compounds.

The compounds of the present invention may be represented by the following structural formula (A):

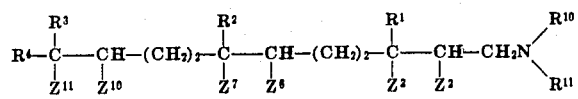

wherein,
each of $R^1$, $R^2$, $R^3$ and $R^4$ is lower alkyl;
each of $R^{10}$ and $R^{11}$ is hydrogen, alkyl, hydroxyalkyl, alkoxyalkyl, phenyl, or, when taken together with the nitrogen atom to which they are attached, pyrrolidino, piperidino, morpholino, piperazino or 4'-(lower)alkylpiperazino group;
$Z^2$ is hydrogen;
$Z^3$ is hydrogen, thereof, bromo, chloro, fluoro, or, when taken together with $Z^2$, is a carbon-carbon double bond between C-2,3 or one of the groups

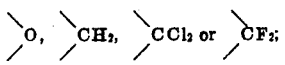

$Z^6$ is hydrogen, thereof, bromo, chloro or fluoro;
$Z^7$ is hydrogen, thereof, bromo, chloro, fluoro, or, when taken together with $Z^6$, is a carbon-carbon double bond between C-6,7 or one of the groups

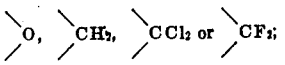

$Z^{10}$ is hydrogen, thereof, bromo, chloro or fluoro; and
$Z^{11}$ is hydrogen, thereof, bromo, chloro, fluoro, or, when taken together with $Z^{10}$, is a carbon-carbon double bond between C-10,11 or one of the groups

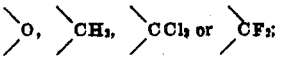

provided that:
a. when $Z^3$ is hydrogen,
b. when $Z^3$ taken together with $Z^2$ is a carbon-carbon double bond, $Z^7$ taken together with $Z^6$ is a carbon-carbon double bond, $R^1$ is methyl, $R^2$ is methyl, $R^3$ is methyl and $R^4$ is lower alkyl — then $Z^{11}$ is bromo, chloro, fluoro, or, when taken together with $Z^{10}$, is one of the groups

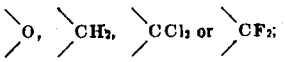

and
c. when $Z^3$ taken together with $Z^2$ is a carbon-carbon double bond, $Z^7$ taken together with $Z^6$ is a carbon-carbon double bond, $R^1$ is methyl, $R^2$ is methyl, $R^3$ is lower alkyl and $R^4$ is methyl -- then $Z^{11}$ is bromo, chloro, fluoro, or, when taken together with $Z^{10}$, is one of the groups

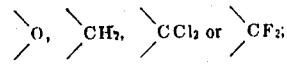

Included within the scope of the present invention are the acid addition salts of the amines.

Included within the scope of the present compounds of formula A are primary amines (each of $R^{10}$ and $R^{11}$ is hydrogen), secondary amines ($R^{10}$ is hydrogen and $R^{11}$ is other than hydrogen) and tertiary amines ($R^{10}$ and $R^{11}$ are both other than hydrogen).

The chain length of the compounds of the present invention is from 12 carbon atoms (where each of $R^3$ and $R^4$ is methyl) to 17 carbon atoms (where at least one of $R^3$ or $R^4$ is n-hexyl). The C-3 and C-7 carbon atoms are substituted with lower alkyl groups ($R^1$ and $R^2$), and the C-11 carbon atom is substituted with two lower alkyl groups ($R^3$ and $R^4$). In addition, the C-2, C-3, C-6, C-7, C-10 and C-11 carbon atoms, independently, are optionally substituted ($Z^2$, $Z^3$, $Z^6$, $Z^7$, $Z^{10}$ and $Z^{11}$) with groups other than hydrogen.

Each of the pair of carbon atoms C-2,3, C-6,7 and C-10,11 can be linked by a single bond, a double bond or can contain a fused grouping, such as oxido, methylene, dichloromethylene and difluoromethylene.

The term "(lower) alkoxy" denotes a group comprising a straight chain aliphatic hydrocarbon of from one to six carbon atoms with an oxygen atom bonded to the C-1 carbon atom. Typical of such (lower)alkoxy are methoxy, ethoxy, 1-propoxy, 1-butoxy, and the like.

The term "alkyl" denotes a group comprising a straight or branch chain aliphatic saturated hydrocarbon having a chain length of from one to eight carbon atoms. Typical of such alkyl are methyl, ethyl, propyl, isopropyl, butyl, pentyl, hexyl, octyl, and the like. When qualified by the term "lower," such a group will have a chain length of no more than six carbon atoms. Typical of such lower alkyl are methyl, ethyl, propyl, isopropyl, butyl, isobutyl, pentyl, hexyl, and the like.

The term "hydroxyalkyl" denotes a group comprising a straight or branched chain aliphatic hydrocarbon of from one to six carbon atoms substituted with one or two hydroxy groups. Typical of such hydroxyalkyl are hydroxymethyl, β-hydroxyethyl, 6-hydroxyhexyl, and the like.

The term "alkoxyalkyl" denotes a group comprising a straight or branched chain aliphatic hydrocarbon of from one to eight carbon atoms substituted with one or two alkoxy groups of from one to eight carbon atoms. Typical of such "alkoxyalkyl" are methoxymethyl, 2-ethoxyethyl, 3-methoxypropyl, 3-ethoxypropyl, and the like.

The presence of double bonds, epoxide groupings and methylene, difluoromethylene or dichloromethylene groupings gives rise to geometric isomerism in the configuration of these compounds.

This isomerism occurs with regard to the double bond, the epoxide grouping or the unsubstituted or di-substituted methylene grouping bridging the C-2,3 carbon atoms, the C-6,7 atoms, and the C-10,11 atoms. Obviously, isomerism at the C-10,11 carbon atoms occurs only when $R^3$ and $R^4$ are different alkyl groups. The isomers are the cis and trans of the monoene series; the cis,cis; cis,trans; trans,cis; and trans,trans of the diene series; and the eight isomers of the triene series; each of which isomers in each series being included within the scope of this invention. Each of these isomers are separable from the reaction mixture by which they are prepared by virtue of their different physical properties via conventional techniques, such as chromatography, including thin-layer and gas-liquid chromatography, as described in more detail hereinafter.

The compounds of this invention are arthropod maturation inhibitors. They possess the ability to inhibit the maturation of members of the phylum Arthropoda, particularly insects, in the passage from one metamorphic stage to the next metamorphic stage. Thus, in the case of insects passing from the embryo stage to the larva stage, thence to the pupa stage and thence to the adult stage, contact with an effective amount of a compound of the present invention, at any of the first three stages, inhibits passage to the next developmental stage with the insect either repeating passage through its present stage or dying. Moreover, these compounds exhibit ovicidal properties with insects and accordingly are useful in combating insects. These compounds are very potent and thus can be used at extremely low levels, e.g. from $10^{-6}$ to $10^{-9}$ g. and are thus advantageously administered over large areas in quantities suitable for the estimated insect population. Generally, the substances are liquids and for the purposes herein described, they can be utilized in conjunction with liquid or solid carriers. Typical insects against which these compounds are effective include mealworm, housefly, bollweevil, cornborer, mosquito, cockroach, moth, and the like.

Although not intending to be limited by any theoretical explanation, it appears that the effectiveness of these derivatives can be traced to their ability to mimic the activity of certain so-called "juvenile hormone" substances, such as those described in U.S. Pat. No. 2,981,655 and Law et al., Proc. Nat. Acad. Sci. 55, 576 (1966). Because of the potency of the compounds of the present invention, they can be employed in extremely low concentrations, as noted above, to obtain reproducible predetermined level of activities. Juvenile hormone substances have been referred to as growth hormone also. Juvenile hormone was identified as methyl 10,11-oxido-7-ethyl-3,11-trimethyltrideca-2,6-dienoate using an extract of cecropia moths by Roeller et al., Angew. Chem. internat. Edit. 6, 179 (February 1967) and Chemical & Engineering News, 48-49 (Apr. 10, 1967). A second juvenile hormone from the same source has been identified as methyl 10,11-oxido-3,7,11-trimethyltrideca-2,6-dienoate by Meyer et al., "The Two Juvenile Hormones from the Cecropia Silk Moth," Zoology (Proc. N.A.S.) 60, 853 (1968). In addition to the natural juvenile hormones and the unidentified mixture of Law et al. above, some synthetic terpenoids have been reported to exhibit juvenile hormone activity — Bowers et al., Life Sciences (Oxford) 4, 2323 (1965) — methyl 10,11-oxido-3,7,11-trimethyldodeca-2,6-dienoate; Williams et al., Journal of Insect Physiology 11, 569 (1965); BioScience 18, No. 8, 791 (August 1968); Williams, Scientific American 217, No. 1, 13 (July 1967); Science 154, 248 (Oct. 14, 1966); Romanuk et al., Proc. Nat. Acad. Sci. 57, 349 (February 1967) - 7,11-dichloro of esters of farnesoic acid - Canadian Pat. No. 785,805 (1968); Masner et al., Nature 219, 395 (July 27, 1968); and U.S. Pat. No. 3,429,970 — farnesene derivatives.

The compounds of the present invention may be prepared chemically according to a number of alternative routes. One such route is illustrated by the following sequence of reactions:

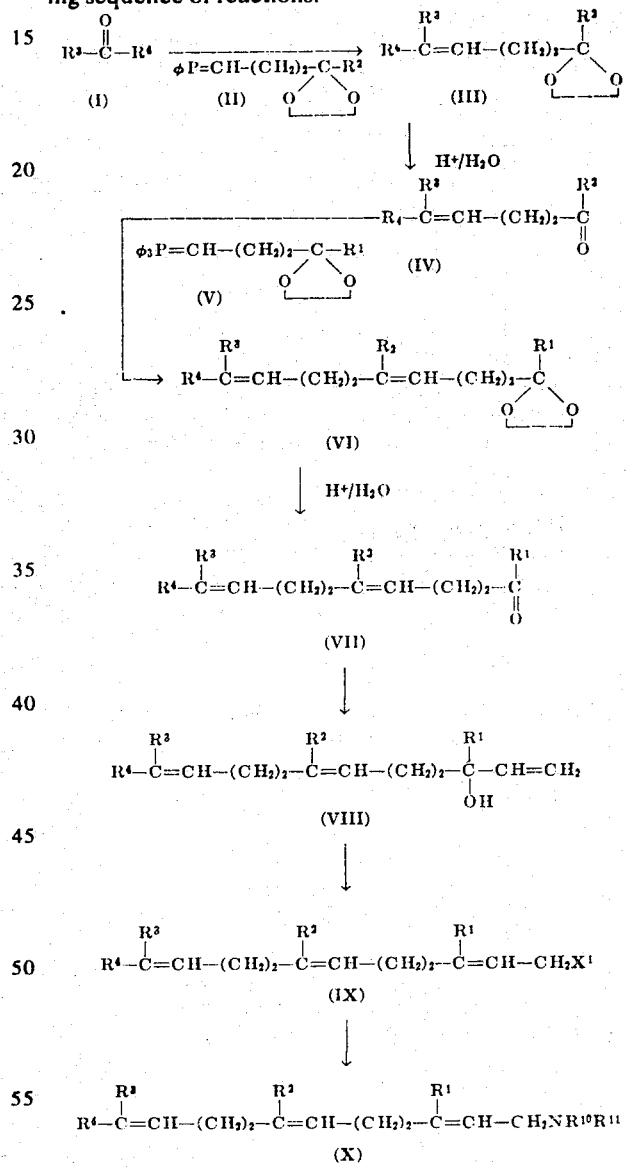

In the above scheme, each of $R^1$, $R^2$, $R^3$, $R^4$, $R^{10}$ and $R^{11}$ is as hereinbefore defined, the symbol "$\phi$" represents phenyl and $X^1$ is bromo or chloro.

With reference to the above reaction scheme (I → X), the selected dialkylketone (I) is reacted with equal molar quantities and, preferably, an excess of the 4-ethylene ketal of the 4-alkylbutylidenetriphenylphosphorane Wittig reagent derivatives (II) in an organic reaction medium, such as is preferably provided by an aprotic solvent with a high dielectric constant, e.g., dimethylsulfoxide, dimethylformamide, and the like, at reflux temperature to afford the corresponding substituted ethylenedioxyalkene Wittig reaction adduct (III). This process thus makes possible the union of hydrocarbon chains with concomitant formation of double bond unsaturation at the juncture.

In the above described process, the 4-ethylene ketal of the 4-alkylbutylidenetriphenylphosphorane Wittig reagent is prepared by conventional procedures, such as is disclosed by Trippett, *Advances in Organic Chemistry*, Vol I, pp. 83–102; Trippett, *Quarterly Review*, Vol 16–17, pp. 406–410; and Greenwald et al., *Journal of Organic Chemistry 28*, 1128 (1963) from the 4-ethylene ketal of a 4-alkylbutyl halide (1-halo-4-alkanone) upon treatment thereof with triphenylphosphine and subjecting the resultant phosphonium halide to the action of butyl or phenyl lithium.

The 4-ethylene ketal of the 1-halo-4-alkanone is obtained by subjecting the 4-keto compound to a conventional ketalysis with ethylene glycol in benzene in the presence of an aryl sulfonic acid, such as p-toluenesulfonic acid. The latter 1-halo-4-alkanones, particularly the 1-bromo derivatives, are prepared by known processes, such as that described in German Pat. No. 801,276 (Dec. 28, 1950) and by Jager et al., Arch. Pharm. 293, 896 (1960). Briefly, the procedure is to treat butyrolactone with the desired alkyl alkanoate to obtain the corresponding α-arylbutyrolactone adduct. Treatment of the latter adduct with an alkali metal halide, particularly sodium bromide, in aqueous sulfuric acid then provides the corresponding 1-bromo-4-alkanone. For example, butyrolactone when treated with ethylacetate gives α-acetylbutyrolactone which upon treatment with sodium bromide in aqueous sulfuric acid gives 1-bromo-4-pentanone.

Hydrolysis of the Wittig reaction adduct (III) with aqueous acid affords the free ketone (IV).

By repeating the Wittig reaction just described on the thus-formed ketone (IV), with the Wittig reagent (V) being prepared as already described, the corresponding ethylene ketal diene adduct (VI) is obtained, which is, in turn, hydrolyzed with aqueous acid to the tetraalkyl substituted nonadienone (VII).

Conversion of the thus-prepared compound (VII) to the 3,7,11-tetra(lower)alkyl-3-hydroxyundeca-1,6,10-triene (VIII) follows upon treatment with vinyl magnesium bromide in an inert, non-aqueous organic solvent, preferably diethyl ether.

The 1-halides represented by formula IX are prepared by treating the corresponding compounds of formula VIII with a phosphorus trihalide, such as phosphorus trichloride or phosphorus tribromide, in a basic solvent, such as pyridine or triethylamine.

The amines represented by formula X are prepared by treating the corresponding 1-chloro or 1-bromo compounds of formula IX, where $X^1$ chloro or bromo, with ammonia to obtain the primary amines of formula X, where $R^{10}$ and $R^{11}$ are each hydrogen; with a mono-substituted amine to obtain the secondary amines of formula X, where $R^{10}$ is hydrogen and $R^{11}$ is other than hydrogen; and with a di-substituted amine to obtain the tertiary amines of formula X, where $R^{10}$ and $R^{11}$ are other than hydrogen.

Alternatively, the amines are prepared from the corresponding amides by the route illustrated by the following reaction sequence:

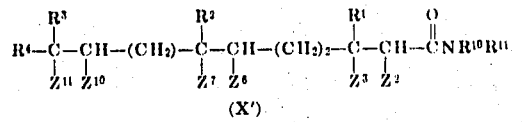

(X')

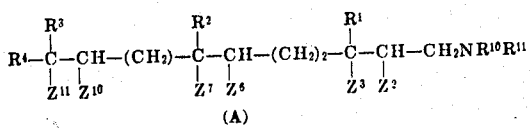

(A)

The amine compounds of formula A are prepared by reducing the corresponding amide of formula X' with a reducing agent, such as lithium aluminum hydride, and the like. This method is especially preferred for the preparation of the 2,3-methyleneamine compounds (compounds of formula A, where $Z^2$ and $Z^3$ taken together are the group

The amide starting compounds of formula X', where $R^1$, $R^2$, $R^3$, $R^4$, $R^{10}$, $R^{11}$, $Z^2$, $Z^3$, $Z^6$, $Z^7$, $Z^{10}$ and $Z^{11}$ are as defined hereinbefore, are prepared according to the procedures described in our U.S. Pat. application Ser. No. 618,339, filed Feb. 24, 1967 now abandoned.

After the compounds of formula VIII, IX and X have been prepared, further optional elaboration of the molecule (represented in formulas A and B by the groups $V^1$, $V^2$, $Z^2$, $Z^3$, $Z^6$, $Z^7$, $Z^{10}$ and $Z^{11}$) via certain preferred sequences, is conducted as follows.

Addition of the fused methylene group at the C-2,3, C-6,7 and C-10,11 positions follows upon reaction of the unsaturated linkages with methylene iodide and a zinc-copper couple in the manner of Simmons and Smith, *J. Am. Chem. Soc. 81*, 4256 (1959).

The addition of the fused methylene (cyclopropyl) group to the unsaturated positions of the molecule can be performed selectively at C-2,3 by the reaction of the unsaturated amide compound of formula X' with dimethylsulfoxonium methylide base [prepared in the manner of Corey et al., *J. Am. Chem. Soc.* 87, 1353 (1965)]in dimethylsulfoxide. The 2,3-methylene amide is then reduced to the corresponding 2,3-methylene amine in the manner described hereinbefore.

Hydrogenation of one or more of the double bonds to the corresponding saturated (carbon-carbon single bond) linkage $Z^2=Z^3=H$, $Z^6=Z^7=H$, $Z^{10}=Z^{11}=H$ is conveniently performed in benzene over a 5percent palladium catalyst on carbon or barium sulfate support.

After all desired elaboration is complete, hydrogenation of any of the unsubstituted double bonds is, if desired, carried out.

Separation of the various geometric isomers can be performed at any appropriate or convenient point in the overall process. An advantageous and particular synthetically valuable point at which to separate isomers by chromatography, and the like, is at the conclusion of each step of the backbone synthesis, that is, after preparing each of the compounds represented by formulas III, VI, VIII, IX and X. Another advantageous point includes that just after the selective addition of the methylene group at C-2,3 in a compound of formula X'.

The acid addition salts of the novel amines of the present invention are prepared from the amines using known procedures. For example, the amine and the acid can be dissolved in an inert solvent in which the acid addition salt is insoluble. The acid addition salt can then be isolated by filtration, or the like. Typical acid addition salts are the hydrochloride, citrate, tartrate, acetate, sulfate, pamoate, and the like.

The following examples will serve to further typify the nature of this invention. As these are presented solely for the purpose of illustration, they should not be construed as a limitation on the scope of this invention.

In some instances, for convenience, the various isomeric forms are specified; however, the carbon-carbon double bonds, epoxide, methylene, difluoromethylene or dichloromethylene groupings can be cis or trans geometric isomers independent of each other and in fact isomeric mixtures are frequently employed in the described reactions.

EXAMPLE 1

A. To a solution of 20.9 g. of the ethylene ketal of 1-bromo-4-pentanone (obtained by treating 1-bromo-4-pentanone with ethylene glycol in benzene in the presence of p-toluenesulfonic acid) in 100 ml. of benzene is added 20 g. of triphenylphosphine. This mixture is heated at reflux temperature for two hours and then filtered. The solid material thus-collected is washed with benzene, dried in vacuo and added to 6.49 g. of butyl lithium in 50 ml. of dimethylsulfoxide. This mixture is stirred until an orange solution is obtained and 3.8 g. of methyl ethyl ketone is then added. This mixture is stirred at about 25°C for about 8 hours, poured into water and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to yield a mixture of the cis and trans isomers of 6-methyl-5-octen-2-one which is separated by preparative gas-liquid chromatography into the individual isomers.

B. To a solution of 20.9 g. of the ethylene ketal of 1-bromo-4-pentanone in 100 ml. of benzene is added 20 g. of triphenylphosphine. This mixture is heated at reflux temperature for 2 hours and then filtered. The solid material thus collected is washed with benzene, dried in vacuo and added to 6.49 g. of butyl lithium in 50 ml. of dimethylsulfoxide. This mixture is stirred until an orange solution is obtained and 5.5 g. of trans 6-methyl-5-octen-2-one (the ketone obtained in Part A) is then added. This mixture is stirred at about 25°C for about 8 hours, poured into water, and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to furnish a mixture of the trans,trans and cis,trans isomers of 6,10-dimethyldodeca-5,9-dien-2-one which is separated by preparative gas-liquid chromatography to the individual isomers.

By repeating the above procedure with the exception of using cis 6-methyl-5-octen-2-one in place of trans 6-methyl-5-octen-2-one, there is obtained a mixture of the cis,cis and trans,cis isomers of 6,10-dimethyldodeca-5,9-dien-2-one which is separated as described above.

Similarly, in the above procedure, instead of using either the trans or cis isomers of 6-methyl-5-octen-2-one as the starting material, there can be used a mixture of the isomers obtained in Part A in which case a mixture of the four isomers is obtained which can then be separated by preparative gas-liquid chromatography into the four isomers.

C. To a solution of 21.0 g. of 6,10-dimethyldodec-5,9-dien-2-one and 250 ml. of dry ethyl acetate, 500 ml. of (4%) reduced palladium-on-barium sulfate are added. The resulting mixture is hydrogenated at room temperature until 0.10 moles of gaseous hydrogen have been taken up. The mixture is filtered over a bed of diatomaceous earth and the filtrate is added to 500 ml. of benzene, washed with four 150 ml. portions of water, dried over sodium sulfate and evaporated to dryness under reduced pressure to predominately yield the desired 6,10-dimethyldodec-5-en-2-one which is purified by preparative scale gas-liquid chromatography.

D. A mixture of 7 g. of methylene iodide and 3 g. of zinc-copper couple in 15 ml. of anhydrous ether is heated at reflux under nitrogen for 3 hours. The mixture is then cooled and 2 g. of 6,10-dimethyldodeca-5,9-dien-2-one are added. This mixture is allowed to stand at room temperature for two hours and is then poured into 200 ml. of 2percent aqueous sodium carbonate and extracted twice with 100 ml. portions of ether. These extracts are dried over sodium sulfate and evaporated under reduced pressure. The residue is held at 0.01 mm. to remove any unreacted methylene iodide and then recrystallized from hexane to yield a mixture of 6,10-dimethyl-5,6-methylenedodec-90en-2-one, 6,10-dimethyl-9,10-methylenedodec-5-en-2-one and 6,10-dimethyl-5,6;9,10-bismethylenedodecan-2-one. The compounds are separated by gas-liquid chromatography.

EXAMPLE 2

A. A solution of 6,10-dimethyldodeca-5,90dien-2-one, prepared by the process of Parts A and B of Example I, (21 g., 0.1 moles) and dry diethyl ether (100 ml.) is added slowly to a suspension of vinyl magnesium bromide (13.1 g., 0.1 moles) in dry diethyl ether. The addition is performed at −20°C. At the completion of the addition, the reaction mixture is allowed to attain room temperature; then the mixture is refluxed for one hour. The mixture is added to an ice cold aqueous ammonia chloride solution; the mixture is extracted with methylene chloride. The extracts are combined, dried over sodium sulfate and evaporated under reduced pressure to yield 3,7,11-trimethyltrideca-1,6,10-trien-3-ol.

Similarly, 3,7,11-trimethyl-11-ethoxytrideca-1,6-dien-3-ol, 3,7,11-trimethyl-6,7-dihydroxytrideca-1,10-dien-3-ol and 3,7,11-trimethyltrideca-1,6-dien-3-ol are prepared by the method of the above process by using 6,10-dimethyl-10-ethoxydodec-5-en-2-one, 6,10-dimethyl-5,6-dihydroxydodec-9-en-2-one and 6,10-dimethyldodec-5-en-2-one as starting materials.

EXAMPLE 3

A. Phosphorus trichloride (13.7 g.) is carefully added to a mixture of 3,7,11-trimethyltrideca-1,6,10-trien-3-ol, prepared in the manner described in Part A of Example 6, (23.7 g.) and pyridine (200 ml.). The addition is carried out at −15°C with stirring. After the completion of the addition, B. By repeating the procedures of Parts A and B of Example 1, the procedure of Part A of Example 2 and the procedure of Part A of this example with the exceptions that in Part A of Example 1 2-butanone (methyl ethyl ketone) is optionally replaced with the ketones listed in Column I and the ketone thus obtained in Part A is used in place of 6-methyl-5-octen-2-one in Part B of Example 1, there is obtained the halides listed in Column II.

| I | II |
|---|---|
| ethyl i-propyl ketone | 1-chloro-3,7,12-trimethyl-11-ethyltrideca-2,6,10-triene |
| methyl n-amyl ketone | 1-chloro-3,7,11-trimethyl-hexadeca-2,6,10-triene |
| ethyl n-butyl ketone | 1-chloro-3,7-dimethyl-11-ethylpentadeca-2,6,10 triene |
| 3-ethyl-2-pentanone | 1-chloro-3,7,11-trimethyl-12-ethyltetradeca-2,6,10-triene |
| diisopropyl ketone | 1-chloro-3,7,12-trimethyl-11-(i-propyl)-trideca-2,6,10-triene |
| methyl n-hexyl ketone | 1-chloro-3,7,11-trimethyl-heptadeca-2,6,10-triene |
| 5-ethyl-3-heptanone | 1-chloro-3,7-dimethyl-11,13-diethylpentadeca-2,6,10-triene |
| 4-decanone | 1-chloro-3,7-dimethyl-11-(n-propyl)-heptadeca-2,6,10-triene |
| di-n-amyl ketone | 1-chloro-3,7-dimethyl-11-(n-amyl)-hexadeca-2,6,10-triene |
| di-n-hexyl ketone | 1-chloro-3,7-dimethyl-11-(n-hexyl)-heptadeca-2,6,10-triene |
| acetone | 1-chloro-3,7,11-trimethyl-dodeca-2,6,10-triene |
| methyl n-propyl ketone | 1-chloro-3,7,11-trimethyl-tetradeca-2,6,10-triene |
| diethyl ketone | 1-chloro-3,7-dimethyl-11-ethyltrideca-2,6,10-triene |
| methyl i-propyl ketone | 1-chloro-3,7,11,12-tetra-methyltrideca-2,6,10-triene |
| methyl n-butyl ketone | 1-chloro-3,7,11-trimethyl-pentadeca-2,6,10-triene |
| ethyl n-propyl ketone | 1-chloro-3,7-dimethyl-11-ethyltetradeca-2,6,10-triene |
| methyl t-butyl ketone | 1-chloro-3,7,11,12,12-pentamethyltrideca-2,6,10-triene |
| methyl i-butyl ketone | 1-chloro-3,7,11,13-tetra-methyltetradeca-2,6,10-triene |
| methyl s-butyl ketone | 1-chloro-3,7,11,12-tetra-methyltetradeca-2,6,10-triene |

C. The procedures of Parts A and B of Example 1, the procedure of Part A of Example 2 and the procedure of Part A of the present example is repeated with the exception that in Part A of Example 1, 1-bromo-4-pentanone is replaced with the 1-bromo-4-ketones listed in Column III to furnish the halides listed in Column IV.

| III | IV |
|---|---|
| 1-bromo-4-hexanone | 1-chloro-3,11-dimethyl-7-ethyltrideca-2,6,10-triene |
| 1-bromo-4-heptanone | 1-chloro-3,11-dimethyl-7-(n-propyl)-trideca-2,6,10-triene |
| 1-bromo-4-octanone | 1-chloro-3,11-dimethyl-7-(n-butyl)-trideca-2,6,10-triene |
| 1-bromo-4-nonanone | 1-chloro-3,11-dimethyl-7-(n-amyl)-trideca-2,6,10-triene |
| 1-bromo-5-methyl-4-hexanone | 1-chloro-3,11-dimethyl-7-(i-propyl)-trideca-2,6,10-triene |
| 1-bromo-6-methyl-4-heptanone | 1-chloro-3,11-dimethyl-7-(i-butyl)-trideca-2,6,10-triene |
| 1-bromo-5,5-dimethyl-4-hexanone | 1-chloro-3,11-dimethyl-7-(t-butyl)-trideca-2,6,10-triene |

Similarly, by repeating the procedure of Part B of the present example using the 1-bromo-4-ketones listed in Column III in place of the 1-bromo-4-pentanone employed in Part A of Example 1, there is obtained 1-chloro-3,12-dimethyl-7,11-diethyltrideca-2,6,10-triene, 1-chloro-3,120dimethyl-7-(n-propyl)-11-ethyltrideca-2,6,10-triene, 1-chloro-3,12-dimethyl-7-(n-butyl)-11-ethyltrideca-2,6,10-triene, 1-chloro-3,12-dimethyl-7-(n-amyl)-11-ethyltrideca-2,6,10-triene, 1-chloro-3,12-dimethyl-7-(i-propyl)-11-ethyltrideca-2,6,10-triene, 1-chloro-3,12-dimethyl-7-(i-butyl)-11-ethyltrideca-2,6,10-triene, 1-chloro-3,12-dimethyl-7-(t-butyl)-11-ethyltrideca-2,6,10-triene, 1-chloro-3,11-dimethyl-7-ethylhexadeca-2,6,10-triene, 1-chloro-3,11-dimethyl-7-(n-propyl)-hexadeca-2,6,10-triene, 1-chloro-3,11-dimethyl-7-(n-butyl)-hexadeca-2,6,10-triene, and the like.

D. The procedures of Parts A and B of Example 1, the procedures of Part A of Example 2 and the procedure of Part A of this example are repeated with the exception that in Part B of Example 1, 1-bromo-4-pentanone is replaced with the 1-bromo-4-ketones listed in Column III furnishing the following halides: 1-chloro 7,11-dimethyl-3-ethyltrideca-2,6,10-triene, 1-chloro 7,11-dimethyl-3-(n-propyl)-trideca-2,6,10-triene, 1-chloro 7,11-dimethyl-3-(n-butyl)-trideca-2,6,10-triene, 1-chloro 7,11-dimethyl-3-(n-amyl)-trideca-2,6,10-triene, 1-chloro 7,11-dimethyl-3-(i-propyl)-trideca-2,6,10-triene, 1-chloro 7,11-dimethyl-3-(i-butyl)-trideca-2,6,10-triene and 1-chloro 7,11-dimethyl-3-(t-butyl)-trideca-2,6,10-triene.

Similarly, by repeating the procedure of Part B of the present example with the exception that in Part B of Example 1, the 1-bromo-4-ketones listed in Column III are used in place of 1-bromo-4-pentanone, there is obtained:

1-chloro 7,11-dimethyl-3-ethyldodeca-2,6,10-triene,
1-chloro 7,11-dimethyl-3-(n-propyl)-dodeca-2,6,10-triene,
1-chloro 7,11-dimethyl-3-(n-butyl)-dodeca-2,6,10-triene,
1-chloro 7,11-dimethyl-3-(n-amyl)-dodeca-2,6,10-triene,
1-chloro 7,11-dimethyl-3-(i-propyl)-dodeca-2,6,10-triene,
1-chloro 7,11-dimethyl-3-(i-butyl)-dodeca-2,6,10-triene,
1-chloro 7,11-dimethyl-3-(t-butyl)-dodeca-2,6,10-triene,
10chloro 7,11-dimethyl-3-ethyltetradeca-2,6,10-triene, 1-chloro 3,11-diethyl-7-methyltrideca-2,6,10-triene,
1-chloro 3-ethyl-7,11,12-trimethyltrideca-2,6,10-triene,
1-chloro 7,11-dimethyl-3-ethylpentadeca-2,6,10-triene,
1-chloro 3,11-diethyl-7-methyltetradeca-2,6,10-triene,
1-chloro 3-ethyl-7,11,12,12-tetramethyltrideca-2,6,10-triene,
1-chloro 3-ethyl-7,11,13-trimethyltetradeca-2,6,10-triene,
1-chloro 3-ethyl-7,11,12-trimethyltetradeca-2,6,10-triene,
1-chloro 3,11-diethyl-7,12-dimethyltrideca-2,6,10-triene,
1-chloro 3-ethyl-7,11-dimethylhexadeca-2,6,10-triene,
1-chloro 3,11-diethyl-7-methylpentadeca-2,6,10-triene,
1-chloro 3,11,12-triethyl-7-methyltetradeca-2,6,10-triene,
1-chloro 3-ethyl-7,12-dimethyl-11-(i-propyl)-trideca-2,6,10-triene,
1-chloro 7,11-dimethyl-3-ethylheptadeca-2,6,10-triene,
1-chloro 7-methyl-3,11,13-triethyltetradeca-2,6,10-triene,
1-chloro 3-ethyl-7-methyl-11-(n-propyl)-heptadeca-2,6,10-triene,
1-chloro 3-ethyl-7-methyl-11-(n-amyl)-hexadeca-2,6,10-triene,
1-chloro 3-ethyl-7-methyl-11-(n-hexyl)-heptadeca-2,6,10-triene,
and the like.

Likewise, by repeating the procedure of Part C of the present example with the exception that in Part B of Example 1, 1-bromo-4-pentanone is replaced with the 1-bromo-4-ketones listed in Column III, there is obtained:

1-chloro 3,7-diethyl-11-methyltrideca-2,6,10-triene,
1-chloro 7-ethyl-11-methyl-3-(n-propyl)-trideca-2,6,10-triene,
1-chloro 7-ethyl-11-methyl-3-(n-butyl)-trideca-2,6,10-triene,
1-chloro 7-ethyl-11-methyl-3-(n-amyl)-trideca-2,6,10-triene,
1-chloro 7-ethyl-3-(i-propyl)-11-methyltrideca-2,6,10-triene,
1-chloro 7-ethyl-3-(i-butyl)-11-methyltrideca-2,6,10-triene,
1-chloro 7-ethyl-11-methyl-3-(t-butyl)-trideca-2,6,10-triene,
1-chloro 3-ethyl-11-methyl-7-(n-propyl)-trideca-2,6,10-triene,
1-chloro 3-ethyl-11-methyl-7-(n-butyl)-trideca-2,6,10-triene,
1-chloro 3-ethyl-11-methyl-7-(n-amyl)-trideca-2,6,10-triene,
1-chloro 3-ethyl-7-(i-propyl)-11-ethyltrideca-2,6,10-triene,
1-chloro 3-ethyl-7-(i-butyl)-11-methyltrideca-2,6,10-triene,
1-chloro 3-ethyl-11-methyl-7-(t-butyl)-trideca-2,6,10-triene,
1-chloro 3,7-diethyl-11-methyldodeca-2,6,10-triene,
1-chloro 3-ethyl-11-methyl-7-(n-propyl)-dodeca-2,6,10-triene,
1-chloro 3-ethyl-11-methyl-7-(n-butyl)-dodeca-2,6,10-triene,
1-chloro 3-ethyl-11-methyl-7-(n-amyl)-dodeca-2,6,10-triene,
1-chloro 3-ethyl-7-(i-propyl)-11-methyldodeca-2,6,10-triene,
1-chloro 3-ethyl-7-(i-butyl)-11-methyldodeca-2,6,10-triene,
1-chloro 3-ethyl-11-methyl-7-(t-butyl)-dodeca-2,6,10-triene,
1-chloro 3,11-diethyl-11-methyltetradeca-2,6,10-triene,
1-chloro 3-ethyl-11-methyl-7-(n-propyl)-tetradeca-2,6,10-triene,
1-chloro 3-ethyl-11-methyl-7-(n-butyl)-tetradeca-2,6,10-triene,
and so forth.

E. The procedure of Parts A and B of Example 1, the procedure of Part A of Example 2 and the procedure of Part A of the present example are repeated with the exception that phosphorus trichloride is replaced with phosphorus tribromide to furnish the corresponding 1-bromo-3,7,11-trimethyltrideca-2,6,10-triene.

Similarly, by repeating the procedures of Parts B, C and D of the present example, with the exception that phosphorus trichloride is replaced with phosphorus tribromide, the corresponding 1-bromo compounds are obtained.

EXAMPLE 4

Twenty-four grams of trans 10-ethoxy-6,10-dimethylundec-5-en-2-one in 200 ml. of dry diethyl ether is added dropwise to a solution of vinyl magnesium bromide in 100 ml. of dry tetrahydrofuran. The addition is performed at −20°C. At the completion of the addition, the mixture is allowed to attain room temperature, and then it is refluxed for 30 minutes. The mixture is poured nnto a mixture of ammonium chloride, ice and water; this mixture is extracted with diethyl ether. The extracts are combined, washed with water, dried over sodium sulfate and evaporated under reduced pressure to yield trans 11-ethoxy-3,7,11-trimethyldodeca-1,6-dien-3-ol.

In a similar manner, trans 3,7,11-trimethyldodeca-1,6-diene-3,11-diol can be prepared from trans 6,10-dimethyl-10-hydroxydodec-5-en-2-one; 3,7,11-trimethyl-11-propoxydodec-1-en-3-ol can be prepared from 6,10-dimethyl-10-propoxyundecan-2-one; and 3,7,11-trimethyldodeca-1,6,10-trien-3-ol can be prepared from 6,10-dimethylundeca-5,9-dien-2-one.

EXAMPLE 5

Fourteen grams of phosphorus trichloride is slowly added to a solution of trans 3,7,11-trimethyl-3-hydroxy-11-chlorododeca-1,6-diene (25.9 g.) and pyridine (110 ml.). The addition is carried out at a temperature of around −15°C with stirring. At the completion of the addition, the mixture is stirred for an additional 4 hours at −50°C. Ten grams of shaved ice is slowly added to the mixture while maintaining the temperature below 10°C. Ether (100 ml.) is added and the mixture is washed with water to neutrality. The organic mixture is dried over magnesium sulfate and evaporated to dryness to yield cis,trans and trans,trans 3,7,11-trimethyl-1,11-dichlorododeca-2,6-diene. The geometric isomers are separated by gas-liquid chromatography.

Similarly, by using phosphorus tribromide in place of phosphorus trichloride, cis,trans and trans,trans 1-bromo-3,7,11-trimethyl-11-chlorododeca-2,6-diene is obtained.

EXAMPLE 6

The compounds under Column VI are prepared from the corresponding compounds under Column V by the procedures described in either Example 3 or 5.

| V | VI |
|---|---|
| cis 3,7,11-trimethyl-3-hydroxydodeca-1,6,10-triene | cis,cis and trans,cis-1-bromo-3,7,11-trimethyldodeca-2,6,10-triene |
| cis 3,7,11-trimethyl-3-hydroxydodeca-1,6,10-triene | cis,cis and trans,cis-1-chloro-3,7,11-trimethyldodeca-2,6,10-triene |
| trans 3,1,11-trimethyl-3-hydroxy-11-ethoxydodeca-1,6-diene | cis,trans and trans,trans-1-chloro-3,7,11-trimethyl-11-ethoxydodeca-2,6-diene |
| 3,1,11-trimethyl-3-hydroxy-11-chlorododec-1-ene | cis and trans-1,11-dichloro-3,7,11-trimethyldodec-2-ene |
| 3,7,11-trimethyl-3-hydroxy-11-acetoxydodec-1-ene | cis and trans-1-chloro-3,7,11-trimethyl-11-acetoxydodec-2-ene |

EXAMPLE 7

To a mixture of 23.6 g. of 3,7,11-trimethyl-3-hydroxytrideca-1,6,10-triene and 100 ml. of pyridine is added 13.7 g. of phosphorus trichloride slowly under dry conditions at −15°C. After the addition is complete, the mixture is stirred for an additional 2 hours at −15°C, and then it is allowed to attain room temperature. Diethyl amine (20 g.) is added to the mixture which contains 1-chloro-3,7,11-trimethyltrideca-2,6,10-triene, and the resulting mixture is allowed to stand for 2 hours. Methylene chloride (200 ml.) is added to the mixture and the mixture is washed with water to neutrality, dried over sodium sulfate and evaporated to dryness under vacuum to yield N,N-diethyl 3,7,11-trimethyltrideca-2,6,10-trienylamine.

Similarly, N,N-diethyl 3,7,11-trimethyldodeca-2,6,10-trienyl amine, N,N-diethyl 3,11-dimethyl-7-ethyltrideca-2,6,10-trienyl amine and N,N-diethyl 3-methyl-7,11-diethylpentadeca-2,6,10-trienyl amine are prepared from the corresponding 1-chloro compounds which are prepared in the manner described in Example 3.

N-methyl 3,7,11-trimethyltrideca-2,6,10-trienyl amine,
N,N-dimethyl 3,7,11-trimethyltrideca-2,6,10-trienyl amine,
N-ethyl 3,7,11-trimethyltrideca-2,6,10-trienyl amine,
N-propyl 3,7,11-trimethyltrideca-2,6,10-trienyl amine,
N,N-dipropyl 3,7,11-trimethyltrideca-2,6,10-trienyl amine,
N,N-di(β-hydroxyethyl) 3,7,11-trimethyltrideca-2,6,10-trienyl amine, and
N,N-di(methoxymethyl) 3,7,11-trimethyltrideca-2,6,10-trienyl amine are prepared by employing methyl amine, dimethyl amine, ethyl amine, propyl amine, dipropyl amine, di(β-hydroxyethyl)amine, and di(methoxymethyl)amine, respectively, in place of diethyl amine in the above process.

EXAMPLE 8

Twenty grams of 1-chloro-3,7,11-trimethyltrideca-2,6,10-triene, prepared in the manner described in Example 7, are added to a 150 ml. solution of pyridine cooled to 0°C and saturated with ammonia. The mixture is allowed to stand overnight at 0°C, then the mixture is reduced to dryness under vacuum to yield 3,7,11-trimethyltrideca-2,6,10-trienyl amine.

Similarly, 3,7,11-triethyltrideca-2,6,100trienyl amine and 3,11-dimethyl-7-ethyltrideca-2,6,10-trienyl amine are prepared from the corresponding 1-chloro compounds which are prepared in the manner described in Example 3.

EXAMPLE 9

A mixture of 7 g. of methylene iodide and 3 g. of zinc-copper couple in 15 ml. of anhydrous ether is heated at reflux under nitrogen for three hours. The mixture is then cooled and 2 g. of N,N-diethyl 3,7,11-trimethyltrideca-2,6,10-trienyl amine are added. This mixture is allowed to stand at 30°C for 2 hours and is then poured into 200 ml. of 2 percent aqueous sodium carbonate and extracted twice with 100 ml. portions of ether. These extracts are dried over sodium sulfate and evaporated under reduced pressure. The residue is held at 0.01 mm. to remove any unreacted methylene iodide and then brought to atmospheric pressure to yield a mixture of N,N-diethyl 3,7,11-trimethyl-2,3-methylenetrideca-6,10-dienyl amine, N,N-diethyl 3,7,11-trimethyl-6,7-methylenetrideca-2,10-dienyl amine, N,N-diethyl 3,7,11-trimethyl-10,11-methylenetrideca-2,6-dienyl amine, N,N-diethyl 3,7,11-trimethyl-2,3;10,11-bismethylenetridec-6-enyl amine, N,N-diethyl 3,7,11-trimethyl-2,3;6,7;10,11-trismethylenetridecyl amine. The compounds are separated by gas-liquid chromatography.

Similarly, the monomethylene, bismethylene and trismethylene derivatives of N,N-diethyl 3,7,11-trimethyldodeca-2,6,10-trienyl amine, N,N-diethyl 3,11-dimethyl-7-ethyltrideca-2,6,10-trienyl amine and N,N-diethyl 3,7,11-triethyltrideca-2,6,10-trienyl amine are prepared by using the latter compounds as starting materials.

The monoene, diene and triene products of Examples 1–8, are appropriate starting materials for the present example.

EXAMPLE 10

One gram of N,N-diethyl 3,7,11-trimethyltrideca-2,6,10-trienylamine in 50 ml. of benzene is hydrogenated with one molar equivalent of hydrogen using 0.3 g. of 5 percent palladium-on-charcoal catalyst at atmospheric pressure and room temperature. The catalyst is then removed by filtration and the filtrate evaporated to yield a mixture of N,N-diethyl 3,7,11-trimethyltrideca-2,6-dienyl amine and N,N-diethyl 3,7,11-trimethyltrideca-2,10-dienyl amine. The compounds are separated by gas-liquid chromatography.

Upon repeating the above procedure with the exception that the hydrogenation is accomplished with two molar equivalents of hydrogen, N,N-diethyl 3,7,11-trimethyltridec-2-enyl amine is obtained.

Similarly, the 2,6-diene, 2,10-diene and 2-ene derivatives of the following compounds are prepared:

N,N-diethyl 3,7,11-trimethyldodeca-2,6,10-trienyl amine, N,N-dimethyl 3,11-dimethyl-7-ethyltrideca-2,6,10-trienyl amine and N,N-dimethyl 3,11-diethyl-7-propyltetradeca-2,6,10-trienyl amine. By the above procedure, the monoene, diene and triene products of Examples 2 through 9 are hydrogenated.

What is claimed is:

1. A compound selected from those of the formula:

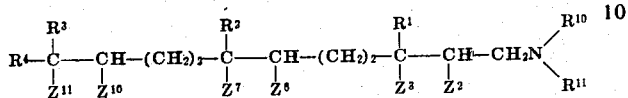

wherein, each of $R^1$, $R^2$, $R^3$ and $R^4$ is lower alkyl;

each of $R^{10}$ and $R^{11}$ is hydrogen, lower alkyl, lower hydroxyalkyl or lower alkoxyalkyl;

$Z^2$ and $Z^3$, when taken separately, each represent hydrogen, and when taken together, form a carbon-carbon double bond between C-2,3 or the group

$Z^6$ and $Z^7$, when taken separately, each represent hydrogen, and when taken together, form a carbon-carbon double bond between C-6,7 or the group

and $Z^{10}$ and $Z^{11}$, when taken separately, each represent hydrogen, and when taken together, form a carbon-carbon double bond between C-10,11 or the group

provided that at least one of $Z^2$ and $Z^3$, $Z^6$ and $Z^7$, or $Z^{10}$ and $Z^{11}$ is the group

2. A compound according to claim 1 wherein $Z^2$ and $Z^3$ form a carbon-carbon double bond and each of $R^1$, $R^2$, $R^3$ and $R^4$ is methyl or ethyl.

3. A compound according to claim 2 wherein each of $Z^6$ and $Z^7$ is hydrogen.

4. A compound according to claim 2 wherein $Z^6$ and $Z^7$ form a carbon-carbon double bond.

5. A compound according to claim 1 wherein $Z^2$ and $Z^3$ form the group

and $Z^{10}$ and $Z^{11}$, when taken separately, represent hydrogen, or taken together, form a carbon-carbon double bond.

6. A compound according to claim 5 wherein $Z^6$ and $Z^7$, when taken separately, represent hydrogen, or taken together, form a carbon-carbon double bond.

7. The compound, N,N-diethyl 3,7,11-trimethyl-2,3-methylenetrideca-6,10-dienylamine, according to claim 6.

8. The compound, N,N-diethyl 3,7,11-trimethyl-10,11-methylenetrideca-2,6-dienylamine, according to claim 2.

* * * * *